United States Patent [19]

Wilson

[11] Patent Number: 4,930,971

[45] Date of Patent: Jun. 5, 1990

[54] LIFT PLATFORM FOR ROAD VEHICLES AND TRAILERS

[76] Inventor: Frederick G. Wilson, 49 Old Hillsborough Rd., Lisburn, County Antrim, Ireland

[21] Appl. No.: 263,776

[22] PCT Filed: Feb. 19, 1988

[86] PCT No.: PCT/GB88/00111

§ 371 Date: Nov. 2, 1988

§ 102(e) Date: Nov. 2, 1988

[87] PCT Pub. No.: WO88/06108

PCT Pub. Date: Aug. 25, 1988

[30] Foreign Application Priority Data

Feb. 21, 1987 [GB] United Kingdom ................ 8704108

[51] Int. Cl.⁵ .......................... B60P 1/44; B66B 9/04
[52] U.S. Cl. .................................. 414/545; 187/9 R
[58] Field of Search ............... 414/540, 545, 662, 663, 414/673; 187/9 R, 17

[56] References Cited

U.S. PATENT DOCUMENTS

| | | | |
|---|---|---|---|
| 2,106,878 | 2/1938 | Sinclair | 187/9 R |
| 2,701,654 | 2/1955 | Williamsen | 414/545 |
| 2,906,374 | 9/1959 | Brumby | 187/17 |
| 3,048,283 | 8/1962 | Phillips | 414/545 |
| 3,240,369 | 3/1966 | Kappen | 414/540 X |
| 3,777,853 | 12/1973 | Miller | 187/9 R |
| 4,467,894 | 8/1984 | Sinclair | 187/9 R X |
| 4,499,971 | 2/1985 | Luebrecht et al. | 187/9 R |
| 4,579,500 | 4/1986 | Robinson | 414/545 |
| 4,638,886 | 1/1987 | Marietta | 187/17 X |

FOREIGN PATENT DOCUMENTS

| | | | |
|---|---|---|---|
| 64304 | 11/1982 | European Pat. Off. | 414/540 |
| 1035570 | 7/1958 | Fed. Rep. of Germany | 187/9 R |
| 1531106 | 8/1969 | Fed. Rep. of Germany | 187/17 |
| 2455227 | 5/1976 | Fed. Rep. of Germany | . |
| 103299 | 2/1964 | Norway | 187/17 |
| 1084226 | 4/1984 | U.S.S.R. | 187/17 |
| 1252279 | 8/1986 | U.S.S.R. | 187/17 |
| 30032 | 12/1909 | United Kingdom | 187/17 |
| 1155845 | 6/1969 | United Kingdom | 414/545 |
| 1202317 | 8/1970 | United Kingdom | 414/545 |
| 2107281 | 4/1983 | United Kingdom | 187/9 R |

Primary Examiner—Frank E. Werner
Assistant Examiner—Robert S. Katz
Attorney, Agent, or Firm—Mason, Fenwick & Lawrence

[57] ABSTRACT

A lift platform for location at the rear of a road vehicle comprising a horizontally extending platform member moveable vertically between at least one vehicle floor level and substantially ground level. Two fluid actuated rams are located vertically, one on each interior side wall adjacent the rear wall of the vehicle. The pistons rods of the rams extend in opposite directions from their respective cylinders. Fluid pressure is connected to be fed via one ram to the other to ensure equal movement of both pistons in the same vertical direction. The rams are connected by wire ropes or chains via pulleys to the platform member, and a fluid equalizing arrangement is connected between the rams for adjusting the horizontal level of the platform members.

4 Claims, 2 Drawing Sheets

LIFT PLATFORM FOR ROAD VEHICLES AND TRAILERS

The invention relates to lift platforms for road vehicles for loading and unloading facilities for vehicles and trailers, such lifting platforms, usually fitted at the rear of the vehicle are well known.

Two types are in general use: one is a cantilever type which is usually fitted to the vehicle chassis frame and elevates from ground level to the vehicle floor, the other type is called a column lift. The column lift generally has a structural member, generally in the form of a square or rectangular hollow section with a lengthwise slot one one face. One such column is fitted vertically at each side of the vehicle with the slots facing inwardly of the vehicle rear opening. In each column a sliding member is located, the sliding member having rollers spaced some distance apart. Each sliding member is attached to the platform in a hinged manner so that when not in use, the platform can be locked in a vertical position.

Traditionally means are generally provided to provide oil pressure to a single acting hydraulic cylinder which is normally located transversely, horizontally either under the floor of the vehicle body or on the roof of the body. Wire ropes or chains are fitted around pulleys with one end of each wire rope or chain being attached to the two sliding members, with the other end secured to the body structure.

By the nature of the design of this type of actuating system a complex system of wire ropes and pulleys is required to provide the elevating means to the lift platform.

One object of the invention is to provide a lift platform for a vehicle with a reduced number of working parts which will be more reliable and more readily servicable.

According to the invention there is provided a lift platform for location at the rear of a road vehicle comprising a horizontally extending platform member movable vertically between one or more vehicle floor levels and substantially ground level, two oppositely acting fluid actuated rams located vertically one on each interior side wall adjacent the rear of the vehicle, fluid pressure being connected to be fed via one ram to the other to ensure equal movement of both rams in opposite directions, the rams being connected by wire ropes or chains via pulleys, to the platform member and fluid equalising means being connected between said rams for adjusting the horizontal level of the platform member.

Preferably a first pulley is attached adjacent each end of the piston of each ram and a second pulley is mounted adjacent the roof of vehicle on each side thereof each with its axis of rotation being horizontally offset with respect to the respective first pulley, respective wire ropes or chains being connected at one end thereof to respective slider members attached to the platform member and passing over the second pulleys and under the first pulleys to be connected respectively to adjacent the roof of the vehicle on the side of vehicle with the ram with the downwardly acting piston and to the cylinder of the ram on the side of the vehicle with the upwardly acting piston, such said movements of the ram pistons being for causing upward movement of the platform and being reversible for downward movement of the platform.

Furthermore the fluid pressure connection to said one ram may be closed by closing a valve adjacent the input thereto and may be connected via a further valve to said other ram for levelling of the platform member.

The further valve may comprise a needle valve to enable fine control of the levelling of the platform member.

Further fluid actuated rams may be connected one between each slider member and its respective side of the platform member for moving the platform member between horizontal and vertical positions. All of the fluid actuated rams are preferably actuated by hydraulic fluid.

The foregoing and further features of the invention may be more readily understood from the following description of a preferred embodiment thereof, by way of example, with reference to the accompanying drawings, in which.

Figure 1:
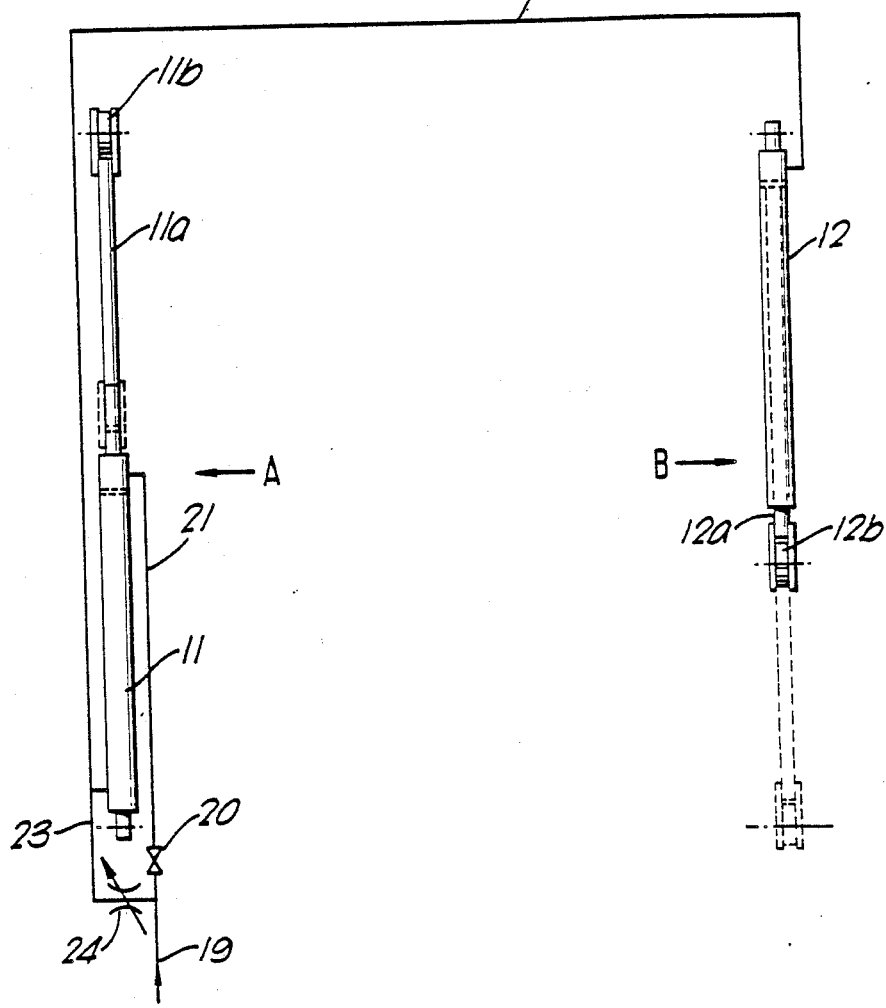
FIG. 1 is a diagrammatic rear elevational view of an hydraulic system for actuating a rear tail lift.
Figure 2:
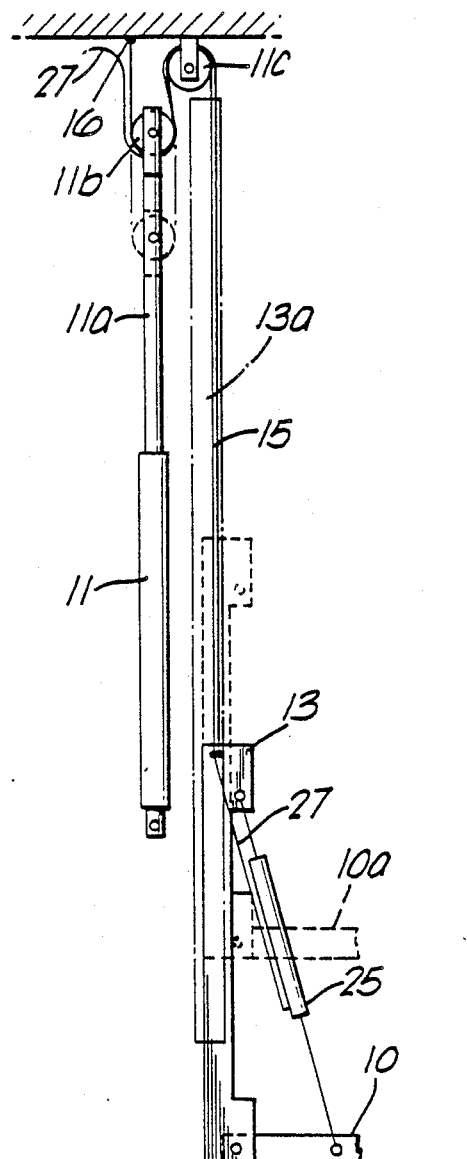
FIG. 2 is an interior side elevational view of the arrangement of FIG. 1 in the direction of arrow A, also showing a tail lift platform and actuating means therefor.
Figure 3:
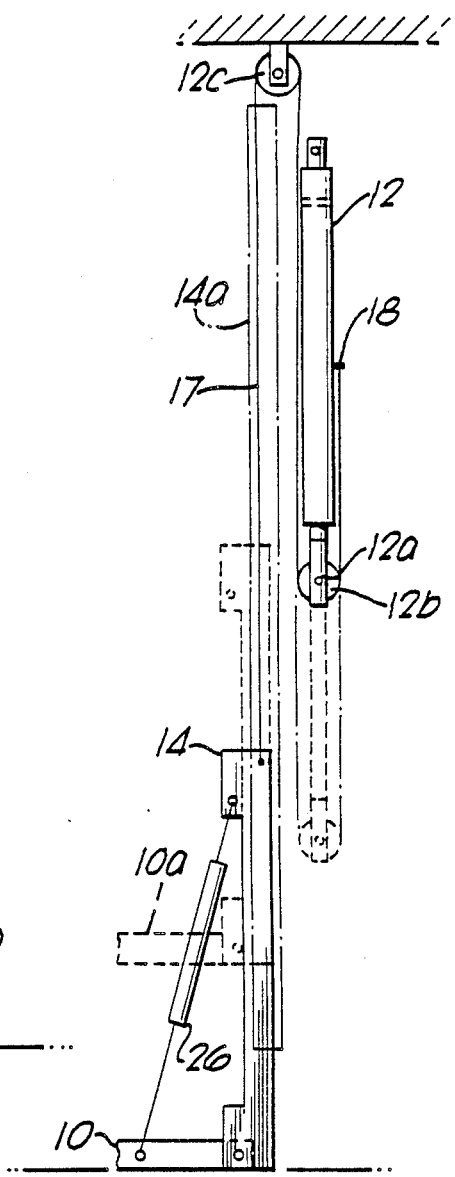
FIG. 3 is a view similar to FIG. 2 but in the direction of arrow B in FIG. 1.

Referring now to the drawings there is shown an actuating mechanism for controlling movement of a lift platform 10, as shown at a ground level position in FIGS. 2 and 3 to various controllable upper levels shown dotted at 10a in FIGS. 2 and 3. A fluid actuable ram 11 is located within the rear of one wall of the vehicle and a further fluid actuable ram 12 is located on the opposed wall in the inner side of the vehicle. The rams 11, and 12 are located offset to operate with opposite action but the same direction of piston movement.

The respective pistons 11a, 12a of the rams 11, 12 each have a respective pulley 11b, 12b rotatably attached at the outer end thereof. Respective sheave pulleys 11c, 12c (FIGS. 2 and 3) are rotatably attached to the roof of the vehicle with their axes of rotation horizontally offset with respect to the respective pulleys 11b, 12b. Respective slider members 13, 14 are attached to the platform member at the outer extremities thereof for sliding movement 10 within respective slotted members 13a, 14a. A chain or wire rope 15 is attached to the top of slider member 13, passes over sheave pulley 11c, beneath pulley 11b and is attached to the roof of the vehicle at point 16. A chain or wire rope 17 is attached to the slider member 14, passes over sheave pulley 12c beneath pulley 12b and is attached to the cylinder of ram 12 at point 18.

A hydraulic supply is provided under pressure of a pump (not shown) at an input point 19 to be fed via a valve 20 and a conduit 21 to the actuating end of the cylinder of ram 11 for controlling movement of the piston 11a thereof. An output from the cylinder of ram 11 is fed via a conduit 22 to the actuating end of the cylinder of ram 12 for actuating the piston 12a thereof. A bypass conduit 23, controlled by a needle valve 24 is connected between hydraulic input 18 and conduit 22 to the cylinder of ram 12.

In use to move platform 10 at its ground position to the elevated position 10a a fluid pressure is applied at input 19 and via conduit 21 causes downward movement of piston 11a, such downward movement causing fluid to be expelled from the cylinder of ram 11 via conduit 22 to similarly cause a downward movement of piston 12a of ram 12. Hence the similar downward movements of pistons 11a, 12a cause a similar downward movement of respective pulleys 11b, 12b causing an upward movement of the ropes or chains 15, 17 thus moving slider members 13, 14 and platform 10 for upward movement of platform 10. The fluid pressure at input 10 is reduced rather than increased and the reverse action takes place. Should the horizontal of platform 10 become out of alignment in use the valve 20 can be closed and the needle valve 24 be opened to allow direct connection via conduit 22 to ram 12 and equalise the fluid content so levelling the platform.

In addition further rams 25, 26 may be attached between respective slide members 13, 14 at each side of platform 10 for actuation via conduits 27 for raising and lowering the platform 10 between a horizontal, loading and unloading position and a vertical transporting condition.

The arrangement described provides a lift platform which has a minimum of pulleys and chains or rope lengths which is easily operable and adjustable.

Furthermore by use of a three-way valve the arrangement can be provided to either operate lifting or lowering platform 10 in its horizontal position or raising and lowering platform 10 between its loading/unloading position and travelling position.

I claim:

1. A lift platform for location at the rear of a road vehicle having first and second opposed interior side walls, comprising:
  a horizontally extending platform member movable vertically between at least one vehicle floor level and substantially ground level;
  first and second fluid actuated rams comprising first and second cylinders, respectively, first and second pistons associated respectively with said first and second cylinders, and first and second piston rods associated respectively with said first and second pistons, said first and second pistons rods extending in opposite directions from said respective first and second cylinders, said first ram being located vertically on the first interior side wall adjacent the rear of the vehicle and said second ram being located vertically on the second interior side wall adjacent the rear of the vehicle;
  first fluid pressure supply means for feeding pressurized fluid to said first cylinder of said first ram to one side of said first piston to move said first piston a distance in one vertical direction;
  second fluid pressure supply means for feeding pressurized fluid from said first cylinder at the other side of said first piston to said second cylinder of said second ram to move said second piston the same distance as said first piston in the same vertical direction as said first piston;
  wire rope and pulley means for connecting said first and second rams to said platform member; and
  fluid equalizing means connected between said first and second rams for setting the horizontal level of said platform member.

2. The lift platform of claim 1, said first fluid pressure supply means being connected to said first cylinder at the side of said first piston to which said first piston rod is attached and said second fluid pressure supply means being at the sides of said first and second pistons remote from said first and second piston rods, respectively.

3. A lift platform for location at the rear of a road vehicle having first and second opposed interior side walls, comprising;
  a horizontally extending platform member movable vertically between at least one vehicle floor level and substantially ground level;
  first and second fluid actuated rams comprising first and second cylinders, respectively, first and second pistons associated respectively with said first and second cylinders, and first and second piston road associated respectively with said first and second pistons, said first and second pistons rods extending in opposite directions from said respective first and second cylinders, said first ram being located vertically on the first interior side wall adjacent the rear of the vehicle and said second ram being located vertically on the second interior side wall adjacent the rear of the vehicle;
  first fluid pressure supply means for feeding pressurized fluid to said first cylinder of said first ram to one side of said first piston to move said first piston a distance in one vertical direction;
  second fluid pressure supply means for feeding pressurized fluid from said first cylinder at the other sid of said first piston to said second cylinder of said second ram to move said second piston the same distance as said first piston in the same vertical direction as said first piston;
  linkage means for connecting said first and second rams to said platform member; and
  fluid equalizing means connected between said first and second rams for setting the horizontal level of said platform member.

4. The lift platform of claim 3, said first fluid pressure supply means being connected to said first cylinder at the side of said first piston to which said first piston rod is attached and said second fluid pressure supply means being at the sides of said first and second pistons remote from said first and second piston rods, respectively.

* * * * *